364-422 SR

XR 3,029,018

74375

X 71009

(2)

April 10, 1962 A. L. FLOYD, JR 3,029,018

TWO DIMENSIONAL ANALOG OF A THREE DIMENSIONAL PHENOMENON

Filed Feb. 21, 1955 3 Sheets-Sheet 1

ACEY L. FLOYD, JR.
INVENTOR.

BY

AGENT

April 10, 1962 A. L. FLOYD, JR 3,029,018

TWO DIMENSIONAL ANALOG OF A THREE DIMENSIONAL PHENOMENON

Filed Feb. 21, 1955 3 Sheets-Sheet 2

ACEY L. FLOYD, JR.
INVENTOR.

BY [signature]

AGENT

TWO DIMENSIONAL ANALOG OF A THREE DIMENSIONAL PHENOMENON

Filed Feb. 21, 1955 3 Sheets-Sheet 3

ACEY L. FLOYD, JR.
INVENTOR.

BY Fritz G. Peterson
AGENT

United States Patent Office 3,029,018

Patented Apr. 10, 1962

3,029,018

TWO DIMENSIONAL ANALOG OF A THREE DIMENSIONAL PHENOMENON

Acey L. Floyd, Jr., Duarte, Calif., assignor, by mesne assignments, to Dresser Industries, Inc., Dallas, Tex., a corporation of Delaware

Filed Feb. 21, 1955, Ser. No. 489,397
4 Claims. (Cl. 235—61.6)

This invention relates to electric analogue systems, and in particular to such analogue systems wherein certain types of problems encountered in three-dimensional systems, as well as problems encountered in two-dimensional systems, may be solved using an analogue device which may be, and preferably is, of simple two-dimensional characteristics. The invention also relates to electric analogue and computer devices and in particular to radiation-sensitive electrical analogue and computer devices and methods of producing such devices.

It is known that problems relating to certain three-dimensional mechanical, magnetic, thermoconductive, and incompressible fluid flow systems, for example, may be represented by the general equation of Laplace, which, for Cartesian coordinates, may be expressed:

$$\nabla^2 V = \frac{\partial^2 V}{\partial x^2} + \frac{\partial^2 V}{\partial y^2} + \frac{\partial^2 V}{\partial z^2} = 0 \qquad (1)$$

wherein $x$, $y$ and $z$ are the three dimensional coordinates in space.

Equation 1 is satisfied by at least the following classes of functions encountered in the physical sciences: (*a*) the gravitational potential in regions not occupied by attracting matter; (*b*) the electrostatic potential in a uniform dielectric in the theory of electrostatics; (*c*) the magnetic scalar potential in free space in the theory of magnetostatics; (*d*) the electric potential in the theory of steady flow of currents in solid conductors; (*e*) the temperature in the theory of thermal equilibrium in solids; and (*f*) the velocity potential at points in a homogeneous liquid moving without rotation in hydrodynamics. Thus this general equation of Laplace may be utilized in solving by electrical analogy any problem falling into any of the several listed types, it being necessary, of course, to construct suitable electrical apparatus representing in its action the analagous action of the physical variable under study or consideration.

Equation 1 above stated is in the form applicable to Cartesian coordinates in a three-dimensional system. The general equation has forms applicable to other coordinate systems, such as, for example, cylindrical coordinates and polar coordinates. For a cylindrical coordinate system the equation is of the form:

$$\nabla^2 V = \frac{1}{r}\frac{\partial}{\partial r}\left(r\frac{\partial V}{\partial V}\right) + \frac{1}{r^2}\frac{\partial^2 V}{\partial \theta^2} + \frac{\partial^2 V}{\partial z^2} = 0 \qquad (2)$$

wherein the coordinate surfaces are: (*a*) right circular cylinders perpendicular to the $x$—$y$ plane of Cartesian coordinates ($r$=constant); (*b*) half planes through $z$- axis, vertical planes, ($\theta$=constant); (*c*) planes perpendicular to the $z$ axis horizontal planes ($z$=constant). This a point P in cylindrical coordinates is located by giving the distance $r$ to the cylinder containing P, and the distance $z$, along the $z$ axis to the horizontal plane containing P.

It is known that if either of the partial differential expressions in (1) or (2) becomes, or is made equal to, zero, the resulting expression is a contraction of the general Laplace equation, applied to variations in a two-dimensional medium defined by the two remaining variables. Thus, if in (2) the expression $$\frac{\partial^2 V}{\partial z^2}$$

were made of zero value, the resulting two-dimensional partial differential Laplace equation would be:

$$\nabla^2 V = \frac{1}{r}\frac{\partial}{\partial r}\left(r^2\frac{\partial V}{\partial V}\right) + \frac{1}{r^2}\frac{\partial^2 V}{\partial \theta^2} = 0 \qquad (3)$$

Electrical analogue devices heretofore constructed to simulate variations of a physical variable in a three-dimensional medium have been relatively complex in both construction and operation, relatively expensive, and not easily changed or varied to accommodate different variables. It is seen from the nature of Equation 3 above that in those special cases wherein a function of one of the classes hereinabove listed involves change of a variable in only two dimensions, or is symmetrical about an axis or line of reference, imaginary or otherwise, in the three-dimensional medium, an analogue device capable of simulating the variation or changes therein need not involve a three-dimensional form, since the Laplace equation applicable to such special cases involves only two variables. An analogue device capable of simulating variations of a physical variable in those special cases just mentioned can, therefore, in theory at least, be constructed in two-dimensional form. It is evident, of course, that such an analogue device would be capable of handling an even wider variety of problems involving physical variables operating or occurring in two-dimensional systems.

In view of the facts and considerations hereinabove set out, it is a prime object of the present invention to provide an analogue device capable of being made in two-dimensional form and which is capable of simulating variations of at least one physical variable in a three-dimensional medium in which there is substantial symmetry with respect to the variable, about a line extending through the medium. Another object of the invention is the provision of a relatively inexpensive analogue device or computer cell which is capable of simulating variations in a physical variable in two-dimensional media and capable of simulating variations in physical variable in a three-dimensional medium wherein there is substantial symmetry with respect to the variable about a line through such medium, and capable of performing computer functions. Another object of the invention is to provide an improved form of electrical analogue device. Another object of the invention is to provide an improved type of radiation-sensitive cell. An additional object of the invention is to provide a novel photoconductive computer device. Another object of the invention is to provide a novel photoconductive electrical device. Another object of the invention is to provide a novel process of producing a photoconductive cadmium sulphide cell. Another object of the invention is to provide a novel analogue computer system adapted for use in simulating and solving problems relating to variations in one or more physical variables encountered in two dimensional media or in a three-dimensional medium in which there is substantial symmetry with respect to each variable, about a line through such three-dimensional medium. Another object of the invention is the provision of an electrical photoconductive analogue cell of relatively low resistance but of relatively large area. Another object of the invention is to provide a simple radiation-sensitive computer cell suitable for a wide variety of purposes.

The above-mentioned objects, and other objects and advantages hereinafter made apparent, are attained by the invention, which is hereinafter explained in connection with a preferred embodiment of apparatus illustrated in the accompanying drawings. In the drawings, similar parts bear like numerals; and:

Hereinafter the several features of the invention are described in connection with several forms of analogue or computer devices, and in connection with a type of analogue system devoted to a specific application of the invention and incorporating an analogue device of a specific construction; it being noted that the invention is of wide application in the arts. The specific analogue system and its specific type or construction of analogue cell, described to fully illustrate application of the invention to solution of problems encountered in one of the hereinabove listed classes of fields, is disclosed in a form more particularly applicable to solution of problems relating to earth borehole investigations, commonly referred to as "electrical logging." In such investigations, the aforementioned symmetry about a line or axis through the three-dimensional medium may be reasonably assumed to exist with respect to the axis of the borehole in which the logging operations are conducted. In the specific analogue system hereinafter described, then, the borehole axis is simulated or represented by a line or axis, real or only theoretical, on a surface comprised in the analogue cell. It will be evident that analogue systems of other construtcion can be made, within the scope and spirit of the invention; and that many different physical forms of analogue cells may likewise be made within the scope of the invention, and a plurality of different computer cell constructions are described to illustrate this point.

Figure 1:
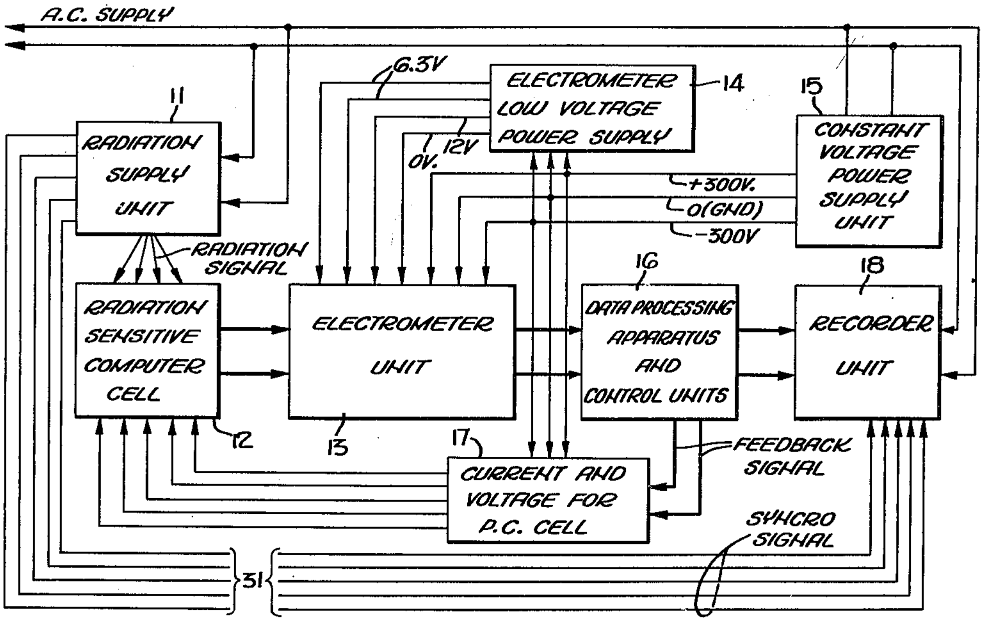
FIG. 1 is a partially schematic block diagram of an electric analogue computer system according to the present invention.

Referring now to FIG. 1, the principal units of the aforementioned specific analogue system are shown diagrammatically in a schematic block diagram. The units comprise an electrically energized radiation-supplying system 11 which supplies radiation preferably in the form of light having a predetermined and controllable distribution or variation in intensity as will hereinafter be more fully explained. The radiation from system 11 is directed toward and received by a radiation-sensitive computer cell unit 12 which may, if the radiation employed is in the form of light, be a photoconductive cell of suitable characteristics and provided with suitable electrodes or terminals, all as hereinafter more fully described. In the preferred form, the computer cell is a novel cadmium sulphide photoconductive cell having properties and characteristics hereinafter more specifically described. The output of unit 12, which is controlled by the radiation incident or impinging upon the radiation-sensitive cell, and upon electrical currents and/or voltages supplied to the cell in a manner and for purposes hereinafter fully explained, is delivered to an electrometer unit 13 which may comprise a suitable amplifier. The electrometer unit is supplied carefully regulated low voltage power from an electrometer low voltage power supply unit 14, and is supplied high voltage power from a constant voltage power supply unit 15 which also provides power to unit 14, as indicated. The characteristics and functions of units 13, 14 and 15, if not obvious, are hereinafter more fully explained.

The output of electrometer unit 13 is fed, as indicated in FIG. 1, to one or more data processing and control units, collectively designated 16, which serve to perform one or more mathematical operations upon the output of unit 13; and which also supply an output to a recorder and a feedback signal whose function is to regulate the operation of a current and voltage supply unit 17 arranged in turn to provide suitably controlled voltages and/or currents to unit 12. A selected portion of the output of the data processing apparatus is supplied to a recorder unit 18 which serves to record the processed data provided by unit 16. The recorder is supplied driving power from mains as indicated, and preferably operates in correlation with a part of system 11 through suitable synchro apparatus and synchro signal leads as indicated. Radiation system 11 may be supplied operating power from the mains; and constant high voltage power is supplied to unit 17 from unit 15, all as indicated.

Figures 2, 3, 4:
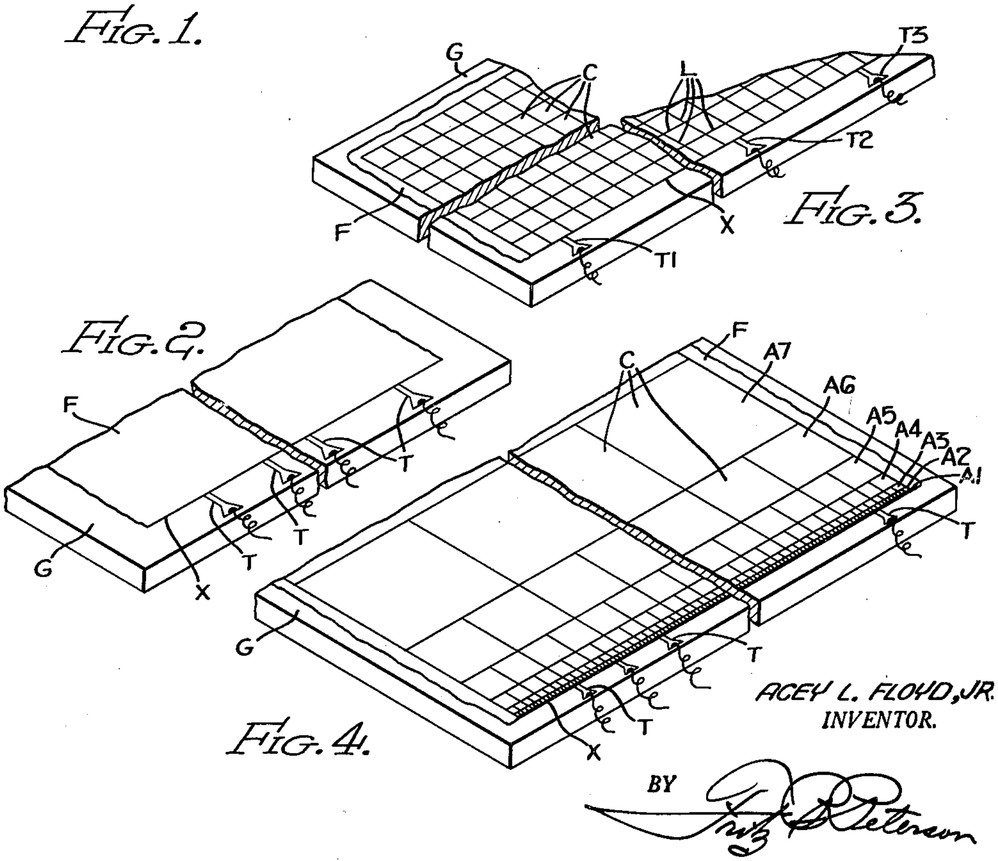
FIG. 2 is a fragmentary isometric view of a simple form of radiation-sensitive analogue cell produced according to a novel process of the invention.
FIG. 3 is a fragmentary isometric view of an improved form of radiation-sensitive analogue cell according to the invention.
FIG. 4 is a fragmentary isometric view of a more complex form of photoconductive cell according to the invention.

Referring now to FIG. 2, a simple form of two-dimensional analogue or computer cell is depicted, in which a support or base G provides a surface, preferably two-dimensional, for the support of a thin film F of radiation-sensitive material. Base G may be of any suitable electrically insulative material, such as glass, and may be curved or warped or flat as illustrated. Film F is comprised of a radiation-sensitive material and may be, for example, a film of vacuum-deposited cadmium sulphide with at least a trace of pure cadmium as an impurity, the cadmium sulphide preferably being applied as a plurality of layers, that is, preferably being of a plural-layer character as hereinafter disclosed. Suitable terminals or electrodes T are provided along one edge of the film F, that edge of the film being preferably straight or linear and forming a hypothetical "origin" or baseline simulating an axis. Film F, prepared according to a novel mode hereinafter fully explained, is photoconductive, has high dark-resistance, and good sensitivity to radiation in the visible portion of the spectrum. Cadmium sulphide is cited as exemplary of the radiation-sensitive materials that may be employed, others being selenium, lead sulphide, germanium, thallium sulphide, etc. In the practice of the invention it is not necessary that the surface upon which film F is supported be flat or planar, or that there even be a base or support; and by the term "two-dimensional" and derivatives thereof as hereinafter employed, is meant surficial in character, that is, conforming to a surface, whether curved or flat. The film is thin, but has finite thickness depending upon the required photoconductivity, dark resistance and other design factors. If provided, the surface upon which film F is supported may be flat, as in the hereinafter described embodiments of the radiation-sensitive cell, but it likewise may be a curved or warped surface, such as the interior or the exterior of a cylinder or other tubular form; or the surface may be such as that presented by a portion of an ellipsoid of revolution, a sphere, a logarithmically curved plane, or the like. The dimensional characteristics of the film and the spacing of the terminals may be widely varied. As will hereinafter be made evident, any electrically insulative surface which is radiation-insensitive and upon which a theoretical or hypothetical origin, pole, reference axis, or baseline may be conceived to reside, is sufficient for the purposes of the invention in its broader aspects. The radiation-sensitive film, which may be, and preferably is, supported by the surface, preferably has an edge coincident with such theoretical axis or baseline. The axis or line may be straight, curved, or circular. In the cell depicted in FIG. 2, the reference axis or base line is indicated in its simplest and preferred status; namely, coincident with a straight line X formed by a boundary of the film F, and thus providing a straight axis coincident with a line. Similarly, the surface is depicted in a preferred form; namely, a plane surface of suitable bounds; although it could be waved or otherwise warped. The extent or area of the radiation-sensitive film is governed by design factors and especially by the radiation-sensitivity and resistivity of the film-forming material. A cadmium sulphide film such as film F depicted in FIG. 2 would require terminals or electrodes precisely spaced apart by only a very small distance, or, alternatively, the output of the cell would require extremely high amplification, for the cell to be useable in a practical system. This is due to the high resistance characteristics of cadmium sulphide. It is evident that it is desirable to have the cell of such characteristics as to render unnecessary any such extreme degree of precision in electrode spacing, and such as to require only moderate amplification of its output to provide a useable signal. In the form depicted in FIG. 2, the radiation sensitive cell would, while useable, suffer the disadvantages just mentioned. The controlled variations in radiation incident on the cell during operation could, to a certain degree, be made to overcome the mentioned disadvantages; as, for example, by provision of radiation-variations of greatest possible magnitude. This of itself presents other disadvantageous features, such as radiation intensities so great as to destroy or impair the cell or elements of the optical system. An efficient way of avoiding the disadvantageous features of a cell constructed as indicated in FIG. 2 is to employ a novel cell made in the manner indicated in FIG. 3. In the latter figure, G is, again, a surface-providing base of electrically insulative material such as glass. To provide for a greatly increased useful radiation-receiving area and consequent wider spacing of terminals or electrodes while at the same time greatly reducing the resistance between terminals or electrodes and the degree of output amplification necessary, a geometrical array or matrix of thin spaced-apart electrically conductive films C of a suitable material such as metal, is provided on the base, the conductive films shown being preferably but not necessarily of substantially the same size, and separated each from adjacent conductive films by a small and preferably uniform distance hereinafter designated *d*. This separation is indicated, for example, by lines L on FIG. 3. The conductive films are preferably applied to the appropriate surface of base G first, and the areas or "lines" between the conductive films then covered by one or a plurality of superposed thin films of the radiation-sensitive material. The latter, being of relatively high resistivity, may cover the conductive films C as well, without adversely affecting operation of the device. That is, film F may be a continuous sheet-like film, as indicated in FIG. 2, rather than a reticulated arrangement of connected films of line-like form. The conductive films or elements C may be applied upon base G in any suitable manner, as for example, by vacuum evaporation onto base G of a continuous single film of metal such as platinum or tungsten, which film is then divided into discrete nonconnected elements C. The division may be effected by a series of scribing operations, using a suitable scriber such as a diamond. Or, elements C may be produced on the surface of base G with extreme accuracy and uniformity of spacing in accordance with a novel and preferred mode of constructing a computer cell, all as hereinafter fully described. Terminals or electrodes such as T1 and T2 of FIG. 3 may be applied at appropriate spots along or adjacent the base line or axis (designated by the letter X), by affixing fine wires to suitable areas of the base by means of silver paste. In its broadest aspects, terminals are not essential in the cell, as input and output lead wires may be made to contact the proper parts of the cell, as is evident. Usually, for the sake of convenience and accurate positioning, terminals will be found to be desirable. If applied, the terminals or electrodes may be in electrical contact with respective conductive elements C, or may be spaced therefrom by a small space on which a portion of film F is deposited, all as hereinafter more fully explained in connection with FIG. 5. The terminals, one of which may be considered to be positioned at an origin or base position, may be suitably disposed as indicated in FIGS. 2, 3, 4, 5 and 6.

Referring again to FIG. 1, in operation the radiation-supplying system 11 provides radiation to unit 12. The radiation is varied in a manner to simulate variations in one or more physical variables in the media under investigation. The variations in radiation may readily be supplied, in the case of visible light, by a simple projector and a photographic film of varying translucency or transparency, the film being traversed through the beam of the projector to cause the desired simulative variations in light directed toward and impinging upon the radiation-sensitive cell of unit 12. For example, the density of silver on the photographic film may, as is easily understood, range from near zero value to a maximum, and the density may vary from area to area along the length of and/or across the width of, the film, to represent or simulate variations in the mentioned physical variable or variables being investigated. To clarify and further explain operation of apparatus according to the invention, the specific application of the principles and apparatus to a study of simulated variations in electrical potential and earth conductivity encountered during the logging or drilling of a deep earth borehole will be explained in detail, it being kept in mind that other applications and advantages of the invention are evident and considerable in number.

A deep earth borehole penetrates earth formations or strata each of which possesses or exhibits characteristics differing from those of other of the formations. It has been determined from experimental evidence that certain electrical and/or nuclear measurements may be utilized to gain knowledge of the structural characteristics and compositions of the strata traversed by the borehole. These measurements are obtained at considerable expenditure of time and money in so-called electrical and radioactivity borehole logging operations. Complete and accurate analysis of the measurements, which are correlated with depth in the borehole, involves a great amount of tedious mathematical work. It is evident that much of the lost drilling time caused by logging operations, and some of the expense thereof, might be saved by utilization of an electrical analogy of the borehole and encircling earth formations, since measurements and evaluations of the simulated formation characteristics could be performed with only a minimum amount of actual borehole logging. Studies relating to the effects of different electrode spacings in logging apparatus, the effects of using different electrode potentials and/or currents, correlation of logging data from one borehole with that from a geologically similar borehole, etc., could readily be performed with a suitable electrical analogue system. Earth boreholes being in a three-dimensional medium, previously devised analogue systems for use in borehole logging studies have been, as hereinabove indicated, relatively complex and costly and not susceptible of easy change and variation. Since for practical purposes it may be assumed that there is substantial symmetry about the axis of an earth borehole, with respect to such physical variables as natural potential, formation resistivity, etc., advantage can be taken of the hereinabove indicated type of analogue system in which the actual analogue device may be of simple two-dimensional form. Hence an electrical analogue cell or device of the photoconductive variety hereinabove generally described may be employed.

A photoconductive analogue cell constructed as indicated in FIG. 3 and as hereinabove described, is applicable to analogue studies of variables in a two-dimensional system, with only a simple optical system providing uniform radiation across the width of the cell and variable lengthwise of the cell. For the specific exemplary application in mind, namely, simulation of conditions in the special case in a three-dimensional system, as in earth borehole logging studies, the optical or radiation system for the cell of FIG. 3 would be much more complex, and such as to provide radiation substantially uniformly increasing in intensity widthwise of the cell, and variable lengthwise of the cell in a manner to simulate variations of the physical variable along the real or imaginary axis in the three-dimensional medium. A more satisfactory way of attaining simulation of uniform change in a physical variable radially of such axis (as, for example, the uniform change in earth conductivity [or resistivity] as measured outwardly from the axis in a plane perpendicular to the axis), is provided by the novel analogue cell construction indicated in FIG. 4. The cell of FIG. 4 may be constructed in a manner similar to that previously set out with respect to FIG. 3 with the notable difference that the electrically conductive films C are of special sizes and not all of substantially the same a real extent as in FIG. 3. For purposes of providing an accurate analogy, the cell must be so constructed that the surface resistivity, as measured from the simulated or theoretical axis thereon, decreases in proportion to increasing distance from that axis; that is, such that the relationship $\gamma = car$ obtains if $\gamma'$ is the surface conductivity measured as noted for resistivity, $c$ is a constant, $a$ is the conductivity of the medium represented by the analogue cell, and $r$ is a function of the distance from the theoretical axis to the point of measurement. Further, while the areas or "lines" between the metallic films C may be produced by scribing as hereinbefore described, they preferably are provided by a novel and improved procedure of constructing the analogue cell as a whole. Construction of a cell designed for the specific purposes of the exemplary system will now be described, it being noted that the process steps are generally applicable to the construction of computer cells for other types of systems as well.

In constructing a preferred specific form of analogue computer cell according to the invention and as applied to simulated borehole logging studied, the conductive films C are disposed in a geometrical array or matrix, the individual films or elements being of square shape and of areas which increase as the perpendicular distance from the theoretical axis increases, as indicated in FIG. 4; whereby, when the photoconductive film is applied to the areas or "lines" between the conductive films, the effective resistivity, along a perpendicular to the axis, decreases substantially uniformly with distance. In other words, the conductive elements and the intervening and interconnecting areas of photoconductive material are so arrayed that the surface resistivity conforms substantially with the relationship expressed by the equation: $C_S = Kr$, wherein $C_S$ is the surface conductivity measured between a point on the surface and the nearest point on the reference axis, K is the constant, and $r$ is a function of the perpendicular distance from the axis to the point and is in this particular example, equal to that distance. Thus, in FIGS. 4 and 5, the conductive films are of substantially square form and are arranged in rows, those of the first row (which may arbitrarily be given the serial number 1) being each of a selected area A1 and each having one edge in alignment with the mentioned reference axis or baseline. Succeeding rows of conductive films are disposed parallel to the first row, and preferably are spaced each from next adjacent rows of such films by a substantially constant distance $d$. Further, the substantially constant spacing of the conductive films or elements each from those next-adjacent, is maintained all about each such film or element to provide between the conductive elements or films line-like areas of substantially constant width $d$ and of various lengths as clearly indicated in FIG. 4. These line-like spaces or areas between the conductive elements are provided or covered with a photoconductive material which interconnects the conductive elements. A preferred procedure for producing an analogue cell having conductive elements and photoconductive means, of the nature and physical arrangement described is as follows: (1) A black and white drawing is made, preferably on a greatly enlarged scale, black lines representing the areas or lines between conductive film areas, and the black lines being of uniform width and of such dimension as to provide inter-film areas of width $d$ when reduced as hereinafter explained. Also, the outlines of the terminals (if such are to be provided) and a margin, are drawn in black, spaced and arranged as desired. The remaining area of the drawing is left white. (2) A master photo negative is made of the drawing thus prepared, using as a minimum a good photoengraving camera for the sake of accuracy, the negative being made of exactly the same scale or size as the analogue cell surface desired. (3) An electrically insulative base, preferably a sheet of glass, is carefully cleaned and uniformly coated with a suitable photo-resist such as dichromated shellac, and dried. (4) The negative is superposed on the coating in contact therewith and the unit is then exposed to strong ultraviolet light through the negative. The light, passing through the negative at only the lines and margins and areas around the terminal areas, "hardens" or alters and renders the coating thereunder not easily soluble in a weak solvent for the coating. The hardened portion of the coating thus corresponds to the black portions of the drawing. (5) The base with its shellac coating is subjected to the action of a weak solvent for the coating (such as a weak alcohol solution) for a time sufficient for the solvent to dissolve the nonhardened shellac, leaving the hardened lines, etc., of the latter adhering on the base. (6) The base and lines, etc., of altered coating are given a very thin overcoating of metal, such as chromium, which may be applied in any suitable manner, such as, for example, by a vacuum evaporation-deposition process. (7) The metal-coated surface portion of the base is subjected to the action of a strong solvent for the altered shellac-resist. A strong hot sodium hydroxide solution is satisfactory for this purpose. As the solvent removes the remaining shellac at the lines, and around the terminals and margins, the thin porous metal coating over the shellac is left unsupported and falls away into the solution, leaving on the base only the separated areas of metal films constituting the squares, the margins, and the terminals. The metal films C thus provided on base G are, in the case of FIG. 4, each of substantially square formation, are arranged in rows parallel to the theoretical or reference axis coincident with line X, and are of areas A1, A2, A3, A4, A5, etc., as indicated in FIG. 4, substantially such that A1=A2/4, A2=A3/4, A3=A4/4, etc. Thus, if the rows of metal films C are arbitrarily assigned consecutive serial numbers 1, 2, 3, 4, etc., commencing with the row next adjacent line X, the area A of any film is substantially determinable by the relationship $A = (C2^n)^2$ wherein C is a constant dependent upon basic design factors and $n$ is the serial number of the row of films in which the film in question is located. Expressed in another way, if the conductive films C are arranged as in FIG. 4, and have edge lengths L, then their dimensions are determinable from the relationship $L = k'r'$ wherein $k'$ is a constant and $r'$ is the perpendicular distance between the center of the film in question and the reference axis. It will be evident that the above areal relationship equations are in fact only approximate because of the finite width $d$ of the line areas between the films. The areal relationship equations are strictly accurate only when $d$ is zero; however, they are sufficiently accurate for all practical purposes. Further, it is not necessary that the areas increase in size exponentially by a factor of 4, as depicted, as other factors may be used provided the resistance of the photo-sensitive film is not too great, and provided the required degree of accuracy is not too great. Also, it should be noted that for analogue cells for other than the exemplary use described, i.e., borehole logging simulation, other conductive film areal relationships may apply. (8) The base G and adherent conductive films, including squares C and the terminal and border films, are now ready for application of a radiation-sensitive material to at least the areas between the conductive films. In the preferred embodiments of analogue cell or computer device, including that depicted in FIG. 4, the radiation sensitive material is in the form of a photoconductive thin film of vacuum deposited cadmium sulphide containing as a sensitizing impurity a very small percentage of pure cadmium; however, as is evident, other photoconductive substances, as previously mentioned, may under certain circumstances be used. The photoconductive material or film preferably is applied to the entire face or top surface of the base on one side of the axis Z. To obtain optimum performance of the photoconductive material or film, special precautions regarding purity of materials and procedure are observed. In preparing the cadmium sulphide for evaporation onto the base, the following procedure is observed: Commercially pure cadmium sulphide in powder form is heated in a stream of helium to a temperature in the range 700° C.–800° C., for a period of several hours. This treatment produces three important and desirable results; namely, (*a*) transformation of the CdS to the $\beta$ phase in which the compound is a photoconductive semi-conductor, (*b*) removal of impurities having boiling points below approximately 700° C., and (*c*) a slight amount of dissociation of CdS into its component elements with removal or elimination of some of the dissociated sulphur, providing a small excess of Cd in the CdS; the sulphur being removed more rapidly than Cd during the dissociation. The excess of Cd provides the impurity necessary for a proper degree of photoconductivity of the CdS-Cd mixture, which photoconductivity may be periodically tested during the course of the heating by removing a sample, mixing with water, and painting the sample onto a glass plate between terminals affixed to the glass, the dried coating being then subjected to radiation and tested for photoconductivity. When the desired degree of photoconductivity has been attained, the CdS-Cd material is ready for application to the analogue cell base. (9) The technique of applying the radiation-sensitive film of the specially prepared CdS-Cd material or mixture to the base is in certain aspects special. The proper amount of the prepared material is placed in or on an evaporating electrode and in a vacuum-chamber. The amount used for any one evaporation should not exceed, and preferably is less than, that required to produce a film no greater than one thousand Angstrom units thick on the base. Thus the amount depends upon the area of the base. If thicker films are desired or required, they preferably are produced by successive evaporations of material from different electrodes. After the evaporation enclosure or chamber is evacuated, preferably to a degree at least as high as $10^{-6}$ mm. of Hg pressure, the coating material is slowly evaporated at a relatively low temperature, that is, at a temperature no higher than necessary to slowly and uniformly sublimate the material, and over an extended period of time such as, for example, twenty minutes for a given evaporation. Several such separate and successive evaporations may be required to deposit a film of the requisite thickness. It is immaterial that the photoconductive film overlies both the line areas between the conductive films and the conductive films as well, as is obvious; but if desired, all of each conductive film except its marginal edges may be masked off during deposition of the CdS-Cd film or films, and the masking material later removed. Any areas of the cell which are not to be coated with the photoconductive material are thus masked. It is desirable, further, to separately heat the analogue cell base, both before and during deposition of the photoconductive material, to a sufficiently high temperature to eliminate any adhering or adsorbed moisture vapor from the base. A temperature of 200° C. may, for example, be maintained without detriment to the conductive films on the base. (10) Following vacuum-coating of the base with one or more layers of CdS-Cd as described, it is preferred to bake the cell, either in air or in a vacuum, at a low temperature, such as at 200° C., to more uniformly disperse the free cadmium throughout the CdS film; and the terminal or electrode wires may be attached with silver paste, followed, in the preferred mode, by coating the cell with a protective coating of an electrically insulative material such as an epoxy resin, "Kel-F," "glyptal" or other suitable substance.

In the just-described procedure of vacuum coating the analogue cell with photoconductive material it is advisable to carefully regulate the temperature of the evaporating electrode to keep the evaporating mixture just at subliming temperature so deposition of the material of the mixture proceeds at a uniform and near minimum rate. This temperature, in the evacuated vessel, is somewhat lower than the temperature to which the commercially pure CdS powder was previously heated in helium at atmospheric pressure. Control of the temperature of the evaporating electrode so as to maintain the CdS-Cd mixture at just the subliming temperature may be assured by slowly raising the temperature to that at which sublimation commences, making continuous readings of the resistance of the deposited film during deposition, and varying the evaporating electrode temperature so as to maintain a substantially constant rate of change of the film resistance during the entire period of sublimation of the powder mixture. Regulation of the temperature of the evaporating electrode or vessel may be effected by regulating its heating current by means of a rheostat, as is understood by those skilled in the art of vacuum-coating of articles. It will be noted that an important purification procedure occurs during the above-described process. As the CdS powder is heated in helium at atmospheric pressure, all evaporable or sublimable impurities which sublime or evaporate below the temperature attained by the containing vessel, are driven out of the powder. Subsequent sublimation of the CdS-Cd mixture at a lower temperature, in a vacuum, precludes evaporation or sublimation to any appreciable extent of any impurities remaining in the mixture, such impurities, if any, failing to reach evaporating or subliming temperature and remaining in or on the evaporating electrode. As a consequence, an exceptionally pure CdS-Cd film is deposited on the cell surface.

Figures 5, 6, 7:
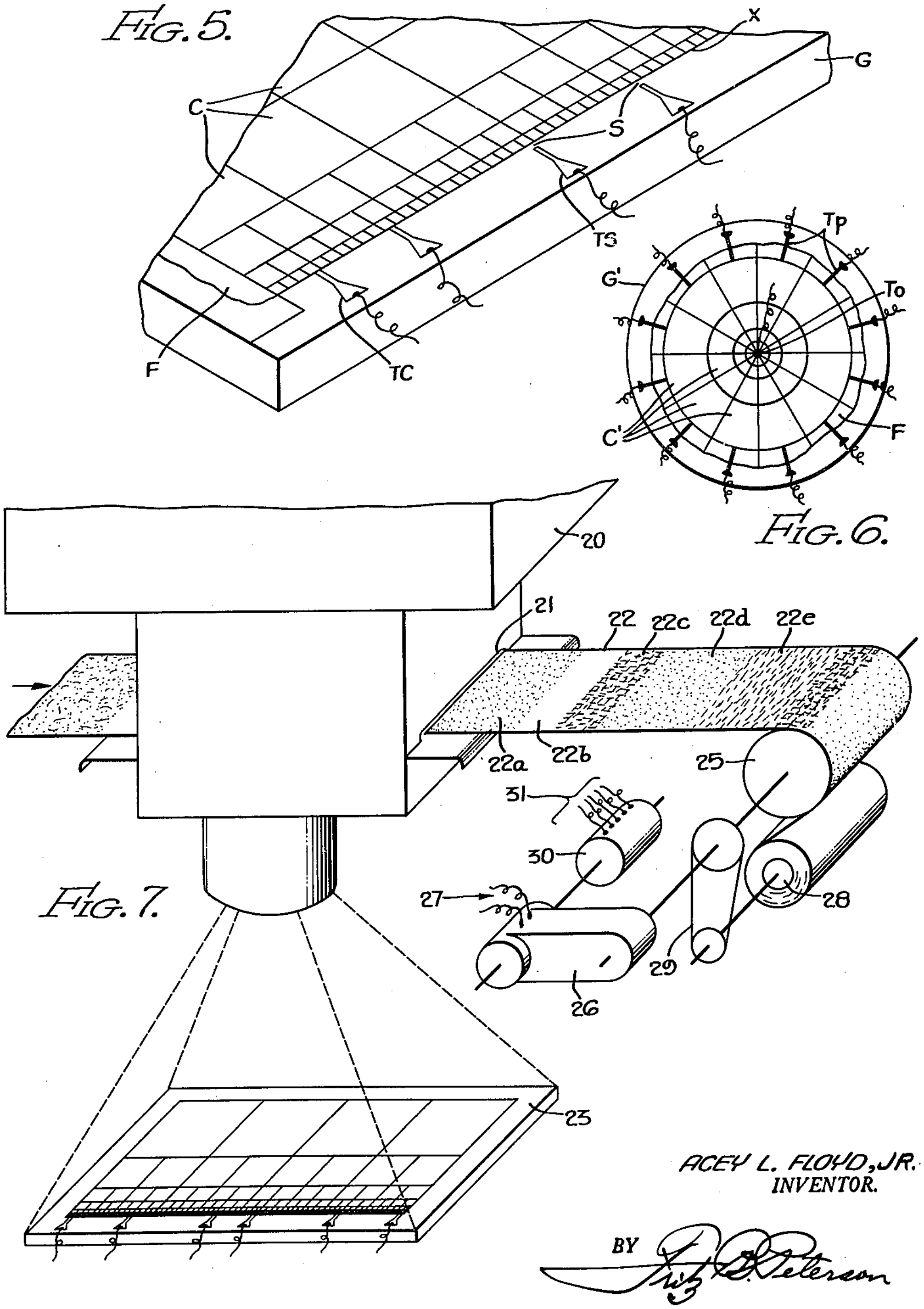
FIG. 5 is an isometric view of a portion of a specific type of photoconductive analogue cell, on an enlarged scale, showing two type of terminal placement.
FIG. 6 is a plan view of a computer device or cell embodying certain features of the invention.
FIG. 7 is a diagram illustrating relative placement of several parts of apparatus of an analogue system conforming to and illustrating features of the invention.

Dimensional characteristics of the analogue cell may vary widely according to design considerations. A cell suitable for simulation of logging studies may, for example, have a base of glass approximately one inch wide, $\frac{3}{32}$ inch thick, and three inches long, upon which are disposed six parallel rows of conductive films each conductive film separated from those next adjacent by a substantially constant distance *d* of 0.0030 inch, the conductive films being arranged as depicted in FIGS. 4 and 5, with each film arranged with two parallel sides parallel with the reference axis and the other two parallel sides perpendicular to that axis; the edge-lengths of the several sizes of square conductive films approximating, respectively, 0.0125 in., 0.025 in. 0.05 in., 0.10 in., 0.20 in., and 0.4 in. The ends and that side of the base next adjacent the largest squares of the exemplary cell preferably are provided with a continuous marginal conductive coating separated from the squares by the line-width distance, *d*. Also, metal-film terminals as desired are provided along the reference axis, either in contact with respective conductive squares or slightly spaced therefrom, as dictated, for example, by such design considerations as the relative resistivity of a borehole liquid with respect to earth formation resistivity, relative diameters of electrodes and borehole, etc., that are desired to be simulated by the cell. A somewhat enlarged illustration of the two mentioned types of terminal arrangement is presented in FIG. 5, wherein $T_c$ is a terminal in conductive contact with a film of the first row of conductive films C, and $T_s$ is a terminal spaced from the nearest conductive square by a predetermined distance *s*. Continuing with the description of the exemplary analogue cell, the photoconductive CdS-Cd film is in four separate layers each of less than 1000 A. thickness and each separately applied in successive steps by evaporation from respective individual electrodes in the vacuum chamber. A film of translucent material is provided over the entire cell. This protective covering may be of gluptal, "epon" or epoxy resins, or the like, care being taken to insure that the protective covering has low water-absorption characteristics and good light transmissivity.

While structural characteristics of a specific exemplary analogue cell according to the invention have been recited, it should be made clear that wide variations in base shape, base material, base and coating dimensions, etc., are permissible, each being governed by design requirements. For example, as depicted in FIG. 6, the base may be circular in plan form, with a central terminal or electrode $T_o$ at the pole of the geometrical array or matrix of conductive films, and a plurality of peripherally disposed terminals or electrodes $T_p$, the electrically conductive films C being in this construction of segmental shape as indicated. A photoconductive film F overlies at least all of the area enclosed by a circle bounding the inner tips of the peripherally arranged terminals. A computer cell of this construction may have radiation directed toward its face along or adjacent an axis passing through the central electrode and suitably varied in intensity; or the variation may be provided by "wobbling," or unsymmetrical rotation of the cell, or by movement of the source of radiation.

Referring now to FIG. 7, there is illustrated somewhat diagrammatically the basic elements of a preferred form of radiation supply unit for use with an analogue cell of the specific form and type previously described and shown in FIG. 5. A film or slide projector 20, adjustable for accurate image focusing and provided with means including a slot 21 for accommodating radiation-absorbing means in the form of a strip-film 22, is suitably mounted by means (not shown) above an analogue cell 23 and in such manner that the projected image of a configuration on or in the film 22 may be accurately focused upon the analogue cell. Film 22 is, as hereinbefore indicated, provided with zones such as *22a*, *22b*, *22c*, etc., of different densities of radiation absorbing material (such as silver grains in an emulsion on the film), whereby when the film is traversed through the projector, varying amounts of radiation are directed on cell 23, thus simulating the variation of a physical variable such as resistivity of earth formations encircling and penetrated by a borehole. Film 22 may be of any suitable length and size, and may be traversed through the projector manually or by suitable means, such as those indicated and including a draw roll 25 driven by a gearmotor 26 having power leads 27. The film may be wound upon a roll 28 by suitable winding means such as are indicated and including pulleys and a slip-belt 29. A synchro-generator 30 is provided to generate a signal whereby the movement of a recorder strip (not shown) in a recorder unit such as unit 18 of FIG. 1, may be correlated with movement of the film. Movement of the film, in this specific instance, represents, for example, logging electrode system traversal through a borehole. The synchro-generator may be suitably driven from the film-traversing mechanism, as, for example, by direct connection with gearmotor 26 as indicated in FIG. 7; and is provided with leads 31 for the purpose indicated in FIG. 1.

While the type of radiation supply unit 11 depicted in FIG. 7 is employed in the disclosed analogue system, it is evident that other types of radiation supply may be used. Also, in the specific type of supply unit disclosed, it may be preferred, in certain cases, to employ glass strips or plates in lieu of film 22, especially where extreme dimensional stability of the radiation varying means is desirable.

Referring again to FIG. 1, details of the circuitry of units 14, 15 and 18 are not shown, inasmuch as these units are available in wide variety on the commercial market and per se are not of the present invention. Units 14 and 15 may be conventional power supplies having a superior degree of regulation. Unit 18 may be any suitable type of commercially available recorder unit having a synchro-controlled driving mechanism for driving the record medium. The recorder synchro-motor, and the synchro-generator of unit 11 must, of course, be compatible elements, as is usual in synchro systems.

Figure 8:
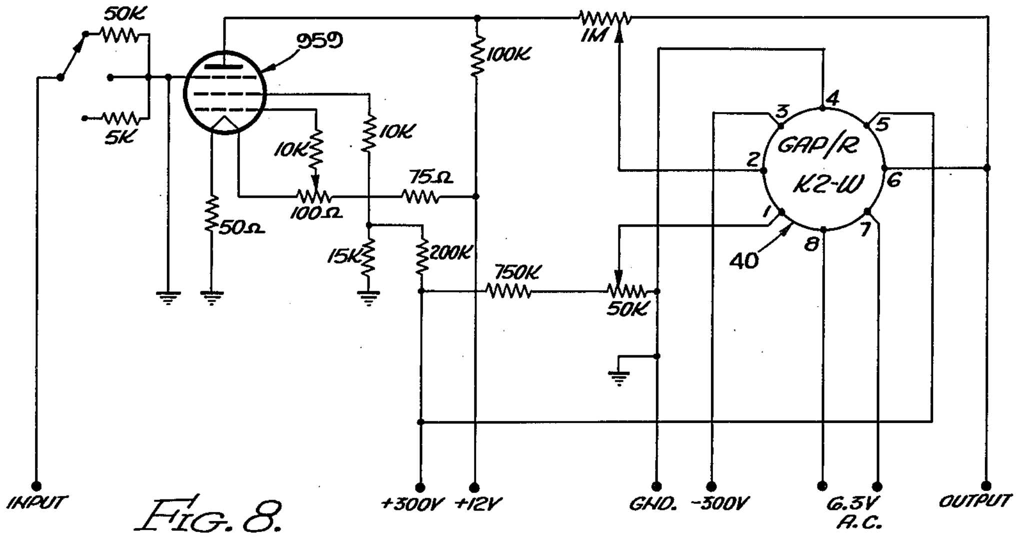
FIG. 8 is a circuit diagram of an electrometer unit useable in the apparatus diagrammatically depicted in FIG. 1.

FIG. 8 depicts the circuitry of a typical electrometer unit 13 useable in the system of FIG. 1, the circuit elements being of values indicated by good electronic circuit design, and conventional with the exception of the element designated by numeral 40. That element is a special commercially available electronic operational amplifier produced by and available from George A. Philbrick Researches, Inc., Boston, Massachusetts, and designated as GAP/R Model K2–W. Element 40 is a two-tube electronic amplifier unit whose variable circuitry and uses are set out in literature supplied by the manufacturer. In the present environment amplifier 40 is employed to amplify the output of the photoconductive analogue cell for application to the data processing and control devices of unit 16.

The data processing apparatus and control devices included in unit 16 of FIG. 1 are employed selectively to perform one or more mathematical operations, comparisons, etc., upon the output of electrometer unit 13, and to produce electrical signals representative of the results of such operations for recording by unit 18 and for the control of unit 17. Unit 17 provides desired voltage, currents and variations thereof, under the control of its input feedback signal from unit 16, for application to the photoconductive analogue cell in unit 12. The elements of unit 16 comprise as many of the aforementioned GAP/R K–2W devices as are necessary to perform the desired individual mathematical operations upon the output of electrometer unit 13, and such switching circuits as are necessary for performing switching functions in applying the input of unit 16 to the several GAP/R K–2W devices and for switching the processed electrical variations to the recorder unit 18 and to the current and voltage control unit 17. While the several mathematical operations performed by unit 16 have been disclosed as being performed by computer devices marketed by a particular manufacturer, it should be noted that other computer devices may be used. Reference may be made to the text "Electronic Analog Computers" by G. A. and T. M. Korn, McGraw-Hill Book Co., 1952, for the theoretical considerations relating to usage and construction of the devices employed in unit 16. Examples of the mathematical operations commonly performed by the devices in analogue operations include adding, subtracting, integrating, differentiating, voltage reproduction, amplification, and polarity inversion.

Figure 9:
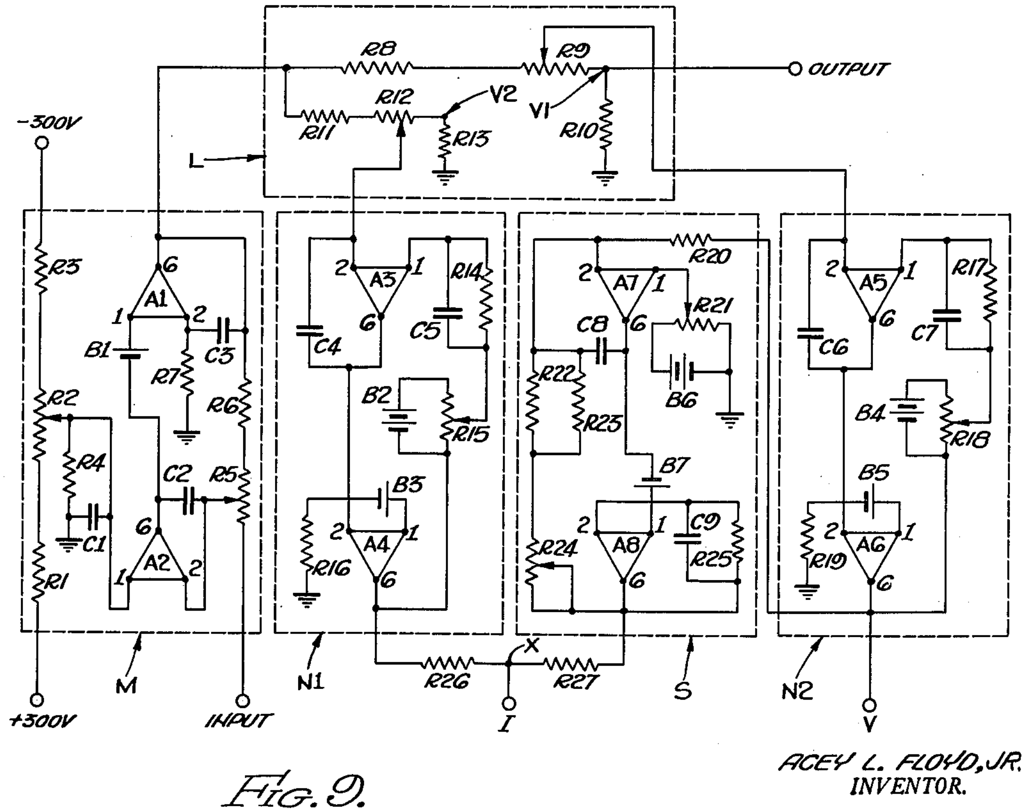
FIG. 9 is a circuit diagram of a current and voltage controlling device useable in the apparatus diagrammatically depicted in FIG. 1.

In FIG. 9 there is illustrated by means of a block type circuit diagram the essential elements of a preferred type of apparatus to be comprised in the current and voltage control unit designated at 17 in FIG. 1. The primary purposes of this unit are to maintain a current, and/or a voltage, supplied to unit 12, proportional to a control signal which may be supplied, for example (1) by an external source (not shown), (2) by the load current to unit 12, or (3) by unit 16. In the first case, unit 17 acts as a forward regulated amplifier; and in the last two cases operates as a degenerative amplifier (constant current or constant voltage generator). In case (2) a signal voltage proportional to the load current is derived. This voltage is produced in the bridge-type network of block L, where the voltages at points indicated at V2 and V1 are such that:

$$V2-V1=6(\text{load current})\div(1+6/26)$$

To make this voltage difference available as a single-sided signal, both V2 and V1 are reproduced by the voltage followers in blocks N2 and N1, respectively, then V1 is inverted with respect to ground voltage in block S. The value V2 plus (−V1), that is, V2−V1, is obtained between the voltage divider network comprising resistors R26 and R27, and this signal is fed into the power control apparatus in block M where it controls the latter degeneratively. The followers represented by blocks N1 and N2 are provided because of the high impedance sources of V1 and V2, the sampling resistors R8 and R11 being of 6 megohms value. This value is needed because of the very low order of the load current, which may be of about $10^{-7}$ ampere. The followers (blocks N1, N2), the inverter (block S) and the power controller (block M) comprise several stages of amplifiers so that the necessary degree of accuracy and stability may be attained.

In case (3), hereinbefore noted in the preceding paragraph, the control signal is the output voltage V1 reproduced by the follower of block N2.

The output level of the controller may be adjusted to the desired value by adjusting the bias of the power unit (block M).

In the apparatus diagrammatically depicted in FIG. 9, the amplifiers A1, A2, A3, . . . A8 are comprised in each instance of one of the hereinbefore mentioned GAP/R K2W units, or the equivalent. The other elements of the circuitry of FIG. 9 may have values, for example, as given in the following tabulation.

*Tabulation of Values of Circuit Elements, FIG. 9*

| | | |
|---|---|---|
| Batteries: | | |
| B1, B3, B5, B7 | v | 1.3 |
| B2, B4, B6 | v | 2.6 |
| Capacitors: | | |
| C1 | mfd | .01 |
| C2, C3, . . . C9 | mmfd | 100 |
| Resistors: | | |
| R1, R3, R9, R12 | | 250K |
| R2 | | 20K |
| R4, R24 | | 10K |
| R5, R7, R16, R19, R25 | | 500K |
| R6, R15, R17, R18, R21 | | 100K |
| R8, R11 | | 6M |
| R10, R13 | | 26M |
| R14 | | 200K |
| R20, R22, R26, R27 | | 400K |
| R23 | | 25M |

As an illustration of the operation of the analogue system, the operation thereof in simulating one type of well known borehole logging will be explained. In the normal borehole logging operation, two electrodes are lowered into the borehole. Into a first of the electrodes is fed a constant value of electric current which returns through the earth to a return or ground electrode relatively remote from the two traversing electrodes. The voltage between the second electrode and the return or ground is measured and recorded as the electrodes traverse the borehole. In operating the analogue system, a similar electrode arrangement is simulated by appropriate terminals T on the photoconductive cell, a constant current is provided by unit 17 to the proper terminal or electrode on the photoconductive cell, and the voltage at the second terminal or electrode is measured by electrometer unit 13 while the radiation impinging on the cell is varied in a manner to represent traversal of a logging tool through earth strata, by movement of film 22 through the projector. Movement of the logging electrodes past formation interfaces is simulated by movement of boundaries between zones such as 22a, 22b, on the film, etc. past the source of illumination. The shadow or image boundary, traversing the analogue cell as the film is moved through the projector, simulates the relative movement of the electrodes of a logging system past successive earth formations. The remote or ground electrode may be simulated by a third terminal or by the margin of the cell. The voltage measured by electrometer unit 13 is fed by unit 16 to the recorder unit 18 and there recorded in the form of a varying graph or line on the recorder strip. The curves obtained from the recorded values are the analogue curves corresponding to true normal electrologging curves obtained by logging the strata simulated by the film. From this explanation of a simple type of operation of the analogue system, it becomes evident how other and more complex analogue operations may be performed, not only with respect to borehole logging, but, as well, operations in the hereinabove mentioned other fields. In such other analogue system operations wide variations in the size, shape, and other characteristics of the analogue or computer cell are permissible, as is evident to those skilled in the art. The same is true of the details of the electric circuitry and elements of the several units of the analogue system.

It may be noted that certain mathematical relationships between areas, distances, etc., have hereinbefore been stated as existing in the case of a specific embodiment of photoconductive computer or analogue cell to be used with radiation uniform transversely of the cell. It is evident that those relationships apply, in general, only to cells wherein the radiation-sensitive surface is planar and the radiation transversely uniform; and that such relationships will be changed and different in those cases wherein the analogue cell surface is not planar and/or the radiation is nonuniform along a line transverse of the cell, and also in those cases wherein the cell is planar but of polar or other nonrectangular configuration. To illustrate, if the cell surface is formed on a logarithmically curved sheet of insulation and exposed to radiation which is uniform on a plane perpendicular to the axis of the radiation, the arrangement of the conductive elements and semi-conductive material may be uniformly dispersed, as they are depicted in FIG. 3. Similarly, it may be noted that the radiation intensity may be made nonuniform areawise, as by means of a filter interposed between the radiation source and film 22, whereby the cell arrangement of FIG. 3 could be employed in investigations of all the classes hereinbefore described. In each such variation of the specific and preferred embodiment of cell and system disclosed, it is only necessary that the areal distribution of radiation applied to the cell be mathematically related in known and proper manner to the areal arrangement of the conductive elements and interconnecting radiation-sensitive material. In the specific case of an analogue cell as depicted in FIG. 4, if the radiation is uniform transversely of the cell (or of line $x$), and the cell is to be employed in solving problems in the aforementioned specific fields of inquiry relating to three-dimensional media in which there is symmetry of the variable in a plane transverse of an axis therein, the surface of the cell is made to conform to the relationship $R'=K'AW$ wherein R′ is a surface characteristic (such as resistivity) of the cell, K′ is a constant, A is the like characteristic of the object which the analogue cell is to represent or simulate, and W is a function of the lateral distance measured from a baseline or reference axis of the cell and representing the axis of symmetry in the three-dimensional medium. For simulation of a variable in a two-dimensional (surficial) medium, the stated mathematical relationship may or may not be applicable, depending upon the type of investigation being made, the characteristic being simulated, and other factors.

In the disclosure set out hereinbefore, it has been shown how a simple and effective analogue device comprising first and second portions of two different types, e.g., conductive and photoconductive, the latter of which is sensitive to variations of a physical variable such as radiation and the former of which is relatively insensitive to the physical variable, may be constructed and so subjected to variations in such physical variable as to simulate or serve as an analogue for the purposes previously set forth. While visible light has been employed as the radiation in the preferred embodiment of the invention, for the sake of simplicity and other design considerations, other types of radiation such as X-rays, ultra-violet radiation, nuclear radiation and infra-red radiation may be employed, depending upon the choice of radiation-sensitive material employed.

It has been made clear to those skilled in the art that various modifications of the mode and apparatus, in whole or in part, and utilizing the concept of the invention, may be made and used. Accordingly, it is not desired to be limited to the specific details of the preferred form of physical apparatus and mode disclosed, but what is claimed is:

1. An electrical analogue device for providing an electrical analogue in an essentially single surface medium, representative of a physical characteristic in a three-dimensional medium in which there is substantial symmetry with respect to said characteristic about a given axis therein, comprising in combination: an electrically insulative base providing a substantially planar surface; means providing a reference axis on said base, simulating said given axis in such three-dimensional medium; a first row of electrically conductive areas each substantially equally separated from adjacent ones of the others of said areas by a distance *d* and disposed along and in substantial contact with said reference axis in said planar surface and each substantially of area A; a second row of electrically conductive areas, each substantially of area KA and each separated from adjacent areas of said second row of areas and from said first row of areas by said distance *d*, K being a constant; a third row of electrically conductive areas each substantially of area $K^2A$ and each separated from adjacent ones of said third row of areas and from said second row of areas by substantially said distance *d*; and other rows of electrically conductive areas on said surface, each similarly disposed with respect to a preceding row of said areas and spaced therefrom by said distance *d* and the area of each area of any one of said other rows of areas being substantially equal to K times that of a single area of the next preceding row of areas and each such area being separated from any other area by substantially said distance *d*; a photoconductive material overlying at least all of said surface lying between said electrically conductive areas to provide a photoconductive connection between at least some of said electrically conductive areas; and electrically conductive terminal means on said surface and disposed along such axis, each of said terminal means being so disposed as to be substantially no farther away from one of said conducting areas than said distance *d* and having at least a photoconductive connection with at least one of said electrically conductive areas; whereby said analogue device may have traversed thereacross in the direction of said reference axis a variable radiation impinging thereon and varying in intensity in accordance with variations of said physical characteristic in said three-dimensional medium to simulate the traversing through said three-dimensional medium along the said given axis therein of a set of electrodes disposed similarly to the disposition of said terminal means on said planar surface.

2. A substantially planar two-dimensional electrical analogue device for use in analogue simulation of variations of an electrical variable in a three-dimensional medium in which there is assumed substantial symmetry with respect to said electrical variable in any plane perpendicular to a given axis extending through said medium, comprising in combination: a base-forming electrical insulator providing a substantially planar surface having a reference axis thereon simulating said given axis; means on said surface arranged to provide narrow line-like areas of the surface separating an array of discrete electrically conductive films each from the other, and an electrically photoconductive material on said surface, covering said line-like areas and interconnecting said electrically conductive films, said line-like areas being of substantially constant width *d* and of a plurality of different lengths and so arranged as to delineate a plurality of rows of such electrically conductive films, and said rows being substantially parallel to said reference axis; whereby the electrical conductivity of said surface is made to obey the relationship $\gamma'=C\gamma\rho$ where $\rho$ represents a function of the perpendicular distance between said reference axis and a point at which said electrical conductivity is to be measured, C is a constant, $\gamma'$ is the surface conductivity of said surface and $\gamma$ is the conductivity of the three-dimensional medium to be simulated by the electrical analogue device.

3. An electrical analogue device capable of accurately representing variations in the electrical conductivity of the earth formations encircling an earth borehole, comprising in combination: means providing a base having a planar surface of electrically insulative material; substantially parallel rows of individually spaced-apart electrically conductive elements on said base separating at least a portion of said surface into line-like areas, and a photoconductive material in said line-like areas and between and in contact with at least some of said conductive elements; means to provide variable illumination of said areas representing changes in said variations in the electrical conductivity of the earth formations along the length of such borehole; and means including terminal means disposed along and in contact with conductive elements of one of said rows, for sensing changes effected in said photoconductive material by said variable illumination.

4. An analogue system for simulating earth borehole investigations of earth formation conductivity comprising in combination: a body of electrically insulative material presenting a surface toward which light may be directed; alternating electrically conductive elements and interconnecting photoconductive means arranged on said surface; terminals connected to different portions of said photoconductive means; means for directing light toward said photoconductive means and for varying the intensity of said light, the physical arrangement of said elements and means and the areal variation in intensity of said light being so interrelated as to produce a simulation of earth formation conductivity; and means connected to said terminals for sensing the variation in the surface conductivity between said terminals in response to said light of varying intensity directed toward said photoconductive means.

References Cited in the file of this patent

UNITED STATES PATENTS

| | | |
|---|---|---|
| 1,072,152 | Ocampo | Sept. 2, 1913 |
| 1,862,189 | McCarthy | June 7, 1932 |
| 1,880,289 | Sukumlyn | Oct. 4, 1932 |
| 1,997,973 | Moore | Apr. 16, 1935 |
| 2,236,172 | Gray | Mar. 25, 1941 |
| 2,401,306 | Lavallee | June 4, 1946 |
| 2,442,823 | Polye | June 8, 1948 |
| 2,445,310 | Chilowsky | July 20, 1948 |
| 2,497,042 | Doll | Feb. 7, 1950 |
| 2,650,311 | Bray et al. | Aug. 25, 1953 |
| 2,695,852 | Sparks | Nov. 30, 1954 |